Dec. 17, 1929.                T. H. LISBY                1,739,682
                          LICENSE PLATE HOLDER
                          Filed April 25, 1929
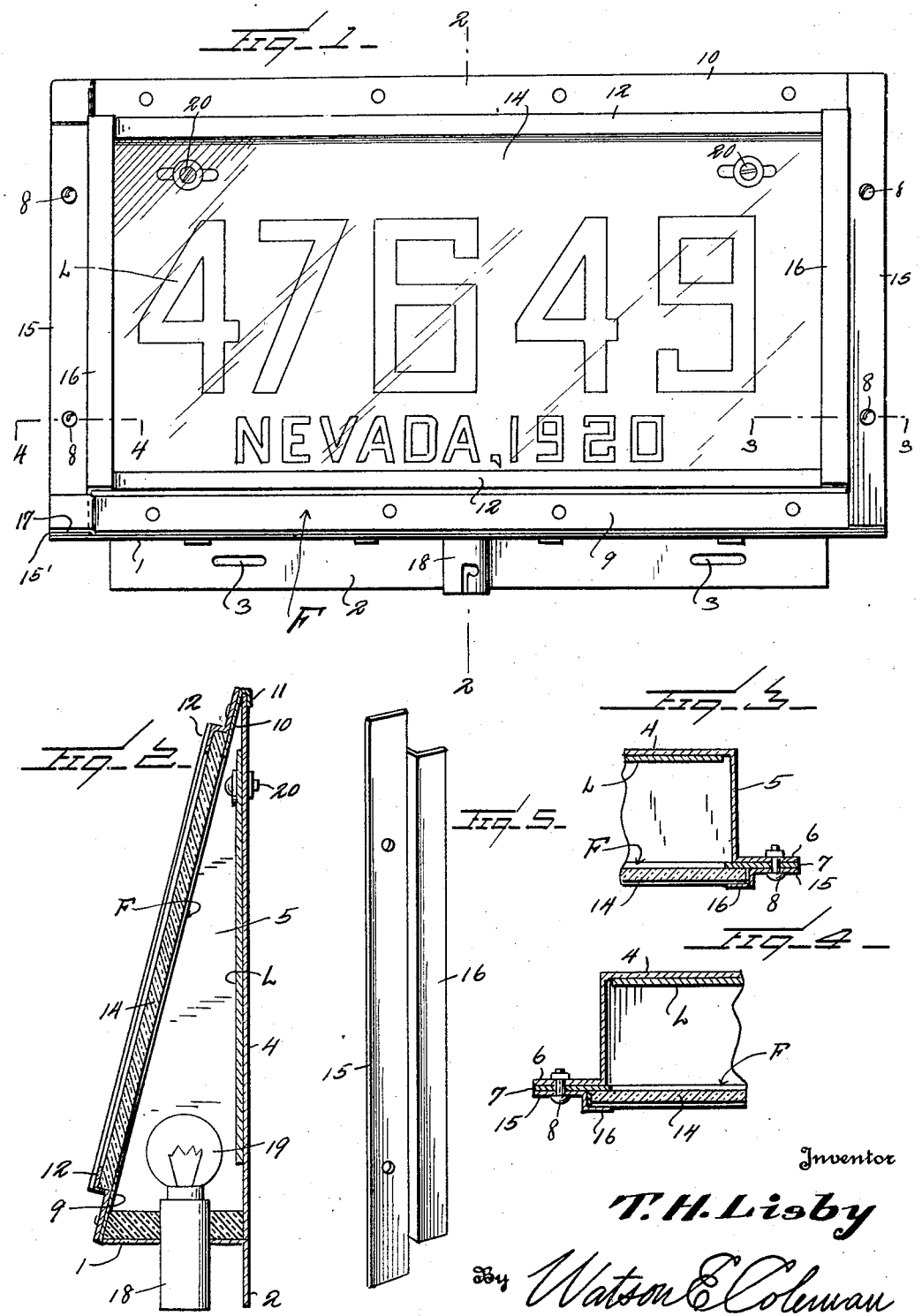
Inventor
T. H. Lisby
By Watson E. Coleman
Attorney Patented Dec. 17, 1929

1,739,682

UNITED STATES PATENT OFFICE

TIGHLMAN H. LISBY, OF TUSCARORA, NEVADA

LICENSE-PLATE HOLDER

Application filed April 25, 1929. Serial No. 358,056.

This invention relates to a license plate holder and has relation more particularly to a device of this kind especially designed and adapted for use in connection with automobiles, and it is an object of the invention to provide a holder of this kind with means whereby the plate carried thereby may be effectively illuminated.

Another object of the invention is to provide a holder of this kind whereby the license plate carried thereby may be illuminated by light rays disposed over the outer face of the plate which is on contradistinction to the general practice of having the necessary illumination passing through the plate.

The invention consists in the details of construction and in the combination and arrangement of the several parts of my improved license plate holder whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is an elevational view of a license plate holder constructed in accordance with an embodiment of my invention with a license plate applied;

Figure 2 is a sectional view taken substantially on the line 2—2 of Figure 1;

Figure 3 is an enlarged detailed sectional view taken substantially on the line 3—3 of Figure 1;

Figure 4 is an enlarged detailed sectional view taken substantially on the line 4—4 of Figure 1;

Figure 5 is a view in perspective of an end member of the frame unapplied.

As disclosed in the accompanying drawing, my improved holder comprises a base member 1 of desired length and relatively narrow in width and which has depending adjacent to its rear longitudinal edge a flange 2 provided with the slots 3 whereby the device may be readily and conveniently attached to a vehicle.

Extending upwardly from the rear of the member 1 and co-extensive in length therewith is a back plate 4 having its extremities formed to provide the end walls 5 extending forwardly therefrom with their lower portions suitably affixed to the ends of the member 1. These walls 5 are inclined upwardly and inwardly from the lower forward edge of the longitudinal margin of the member 1 to the upper margin of the back plate 4 whereby each of the walls 5 is substantially in the form of a right triangle. The forward and inclined margins of the walls 5 are defined by the outstanding flanges 6 at right angles thereto.

A frame F is provided, the end members 7 of which being adapted to be disposed over the flanges 6 and secured thereto by the removable members or bolts 8. The lower longitudinal member 9 of the frame F overlies the front edge face of the member 1 while the upper or marginal portion of the top longitudinal member 10 is provided with a reverted flange 11 which is adapted to be disposed from above over the upper marginal portion of the back plate 4. Each of the longitudinal margins 9 and 10 are provided along their inner marginal portions with the outwardly disposed channel runways 12 which are adapted to slidably receive the longitudinal marginal portions of a panel 14 of glass or other transparent material and which panel is adapted to extend over the central opening of the frame F.

Each of the end members 7 of the frame is adapted to have disposed thereover an elongated plate or strip 15 through which the bolts 8 are also adapted to be directed to hold the same in applied or working position. The marginal portion of each of these strips 15 for a distance extending between the channel runways 12 is formed with an angular holding flange 16 to receive an end portion of the panel 14 when said strip 15 is applied, thus effectively holding the applied panel against displacement.

The extremities of the strips 15 are extended, as at 15′ and each of said extended portions 15' is received within an open slot or recess 17 provided in the adjacent end portion of a member 9 or 10.

The central portion of the member 1 is provided with a socket 18 adapted to be connected with a suitable source of electrical energy and said socket 18 is also adapted to have engaged therewith a lighting unit 19 preferably a bulb. It is to be noted that the applied lighting unit is positioned in advance of the back plate 4 and that the rays emitted therefrom will effectively illuminate the license plate L suitably secured, as at 20, to the inner face of the back plate 4 or that face of the back plate opposed to the applied panel 14.

The upper holding bolts 20 for the plate L if desired may also be caused to engage a conventional tie rod disposed across the forward end of the body of an automobile.

From the foregoing description it is thought to be obvious that a license plate holder constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A license plate holder comprising a base member, a back plate carried thereby and extending upwardly from the rear thereof, forwardly disposed end plates carried by the extremities of the back plate and the extremities of the base member, the forward margins of the end plates being provided with outstanding flanges, a frame having members overlying said flanges and the front of the base member, said frame having a top member provided with means engaging the upper marginal portion of the back plate, a transparent panel disposed over the frame to provide a front wall, means for holding said transparent panel to the frame, an illuminating member carried by the base member in advance of the back plate, and means for holding a license plate to the back plate and within the housing.

2. A license plate holder comprising a base member, a back plate carried thereby and extending upwardly from the rear thereof, forwardly disposed end plates carried by the extremities of the back plate and the extremities of the base member, the forward margins of the end plates being provided with outstanding flanges, a frame having members overlying said flanges and the front of the base member, said frame having a top member provided with means engaging the upper marginal portion of the back plate, a transparent panel disposed over the frame to provide a front wall, an illuminating member carried by the base member in advance of the back plate, means for holding a license plate to the back plate and within the housing, means for holding the transparent panel to the frame including a strip overlying an end member of the frame and coacting with a marginal portion of the panel, means for detachably connecting said strip to such end member, said strip when removed permitting application or removal of the panel.

In testimony whereof I hereunto affix my signature.

TIGHLMAN H. LISBY.